United States Patent
Zhou et al.

(10) Patent No.: US 12,424,639 B2
(45) Date of Patent: Sep. 23, 2025

(54) FUEL CELL HAVING BIPOLAR PLATES WITH MULTI-LAYERED DEHOMOGENIZED TURING-PATTERN MICROSTRUCTURE CONFIGURATION

(71) Applicant: Toyota Motor Engineering & Manufacturing North America, Inc, Plano, TX (US)

(72) Inventors: Yuqing Zhou, Ann Arbor, MI (US); Ercan M. Dede, Ann Arbor, MI (US); Tsuyoshi Nomura, Tokyo (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 270 days.

(21) Appl. No.: 17/085,413

(22) Filed: Oct. 30, 2020

(65) Prior Publication Data

US 2022/0140360 A1    May 5, 2022

(51) Int. Cl.
*H01M 8/10*        (2016.01)
*H01M 8/0258*   (2016.01)
*H01M 8/0267*   (2016.01)

(52) U.S. Cl.
CPC ....... *H01M 8/0267* (2013.01); *H01M 8/0258* (2013.01)

(58) Field of Classification Search
CPC ............. H01M 8/0258; H01M 8/0267; H01M 8/0223; H01M 8/0265; H01M 8/0254; H01M 2008/1095; Y02E 60/50
USPC ......................................................... 429/257
See application file for complete search history.

(56) References Cited

U.S. PATENT DOCUMENTS

| | | | |
|---|---|---|---|
| 5,942,347 A * | 8/1999 | Koncar ............... | H01M 8/0273 264/105 |
| 7,067,213 B2 | 6/2006 | Boff et al. | |
| 2007/0082252 A1* | 4/2007 | Goebel ............. | H01M 8/04074 429/457 |
| 2007/0105000 A1* | 5/2007 | Chapman .......... | H01M 8/04291 429/534 |
| 2011/0262831 A1* | 10/2011 | Dadheech ........... | H01M 8/0208 429/479 |
| 2014/0162165 A1* | 6/2014 | Song ................... | H01M 8/0263 429/465 |
| 2015/0221962 A1* | 8/2015 | O'Neill ............. | H01M 8/04074 429/434 |
| 2019/0020041 A1* | 1/2019 | Paone ................ | H01M 8/0267 |

(Continued)

OTHER PUBLICATIONS

Shi Zeng, Poh Seng Lee, "A Header Design Method for Target Flow Distribution among Parallel Channels Based on Topology Optimization" (Year: 2018).*

(Continued)

*Primary Examiner* — Christian Roldan
(74) *Attorney, Agent, or Firm* — Jordan IP Law, LLC

(57) ABSTRACT

A fuel cell that includes an air fuel cell bipolar plate and a hydrogen fuel cell bipolar plate respectively having a Turing-pattern microstructure configuration. The spatial arrangement of the air fuel cell bipolar plate and the hydrogen fuel cell bipolar plate is such that the air layer of the air fuel cell bipolar plate and the hydrogen layer of the hydrogen fuel cell bipolar plate are opposed to each other to define a microstructure configuration for a coolant layer.

13 Claims, 12 Drawing Sheets
(4 of 12 Drawing Sheet(s) Filed in Color)

(56) References Cited

U.S. PATENT DOCUMENTS

| | | | |
|---|---|---|---|
| 2019/0221866 A1* | 7/2019 | Gambini | H01M 8/1004 |
| 2020/0243888 A1* | 7/2020 | Gervasio | F04B 45/04 |
| 2020/0391876 A1* | 12/2020 | Morrison | B64U 30/20 |

OTHER PUBLICATIONS

Kandlikar, Satish & Lu, Zijie & Edu, Zxleme@rit & Trabold, Thomas. Current status and fundamental research needs in thermal management within a PEMFC stack. (Year: 2014).*

Wilberforce et al., A comprehensive study of the effect of bipolar plate (BP) geometry design on the performance of proton exchange membrane (PEM) fuel cells, Renewable and Sustainable Reviews, Elsevier, 111(2019) 236-260. (Year: 2019).*

Iranzo et al., "Biomimetic Flow Fields for Proton Exchange Membrane Fuel Cells: A Review of Design Trends," 2020, 37 pages.

Kloess et al., "Investigation of Bioinspiredflow Channel Designs for Bipolar Plates in Protonexchange Membrane Fuel Cells," Journal of Power Sources, vol. 188, Issue 1, Mar. 1, 2009, 10 pages.

Ouellette et al., "Assessment of Different Bio-Inspired Flow Fields for Direct Methanol Fuel Cells Through 3D Modeling and Experimental Studies" International Journal of Hydrogen Energy 43, 2018, pp. 1152-1170.

* cited by examiner

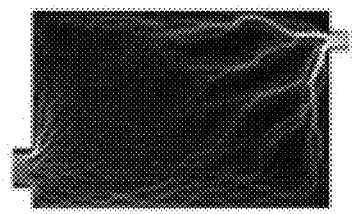 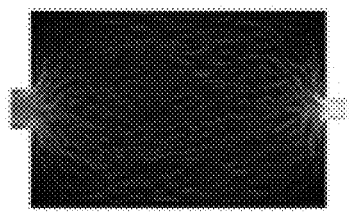 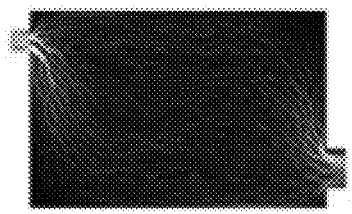
FIG. 9A  FIG. 9B  FIG. 9C
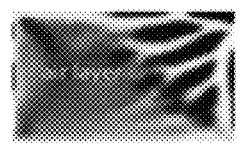 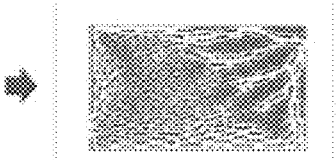 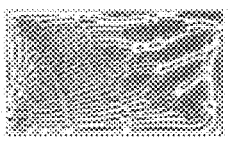 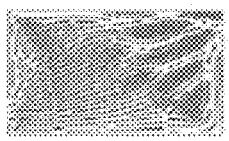
FIG. 10A  FIG. 10B  FIG. 10C  FIG. 10D
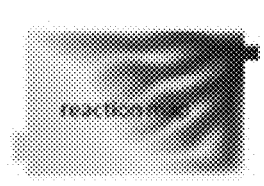 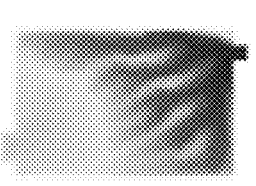 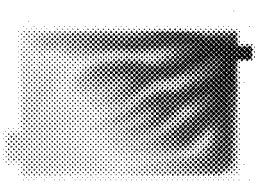 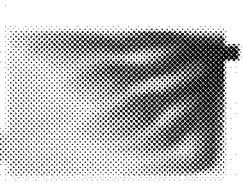
FIG. 11A  FIG. 11B  FIG. 11C  FIG. 11D
 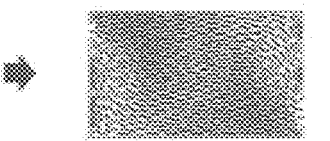 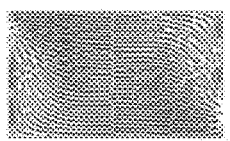 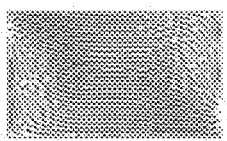
FIG. 12A  FIG. 12B  FIG. 12C  FIG. 12D

FUEL CELL HAVING BIPOLAR PLATES WITH MULTI-LAYERED DEHOMOGENIZED TURING-PATTERN MICROSTRUCTURE CONFIGURATION

TECHNICAL FIELD

Embodiments relate generally to a fuel cell (FC) having optimally-designed fluid flow networks. In particular, embodiments relate to a FC having bipolar plates with multi-layer Turing-pattern microstructures for efficient fluid distribution.

BACKGROUND

Hydrogen fuel cell (FC) technology has been utilized widely in a variety of stationary and non-stationary applications, e.g., space transport, satellites, motor vehicles, power generation, and electronics. The FC device converts chemical potential energy into electrical energy.

A FC stack generally comprises hundreds of FCs arranged in a stack formation. Each individual FC in the stack may have a structure comprising a membrane electrode assembly (MEA) which is interposed between plates representing electrodes. The MEA is as a proton exchange membrane (PEM) cell having sides coated with a catalyst for the hydrogen oxidation (anode) and oxygen reduction (cathode). Gas diffusion layers (GDL) are used to deliver the reactant fuels to the electrodes from bipolar plate channels.

In operation, a first fuel reactant, for example, hydrogen ($H_2$), is supplied to the anode via a hydrogen layer, and a second fuel reactant, for example, oxygen ($O_2$) is supplied to the cathode via an air layer. Hydrogen and air enter the FC stack and mix within the reaction region of the MEA and flow through channels formed in the hydrogen layer and the air layer to produce electricity, with water and heat as reaction byproducts.

Additionally, coolant also enters and exits the FC stack and flows outside of the reaction zones within coolant channels. In compact configurations, coolant channels are defined by the opposite sides of the hydrogen plate and the air plate. In such configurations, however, the coolant channels are very narrow or completely blocked, while in other regions the coolant channels are wide and open. This may lead to non-uniform cool throughout the FC stack, and consequently, inefficient FC stack performance.

As the FC technology moves towards the cost-aware commercial sectors, the challenge of designing high performance, low cost, lightweight, and compact FC stacks has sparked trending interests in novel configuration design of flow networks in FC bipolar plates.

In the design of FCs, an inverse design approach has been used in which the design of flow fields is formulated as a material (i.e., channel or wall) distribution problem. The use of inverse design methods for designing FC bipolar plates, however, has been limited to a single layer configuration. Contemporary design methods generally use explicit topology optimization, which are inevitably expensive in computation. Consequently, resultant designs from the topology optimization methods all have a reduced number of channels, as opposed to hundreds of channels.

BRIEF SUMMARY

In accordance with one or more embodiments, an FC stack includes FCs comprising bipolar plates having optimally-designed multi-layer fluid flow networks.

To satisfy different aspects of design requirements, a multi-objective optimization problem is formulated to simultaneously optimize multi-layer (i.e., air, hydrogen, and coolant) flow networks. The optimized design is found iteratively via multi-physics simulations and sensitivity analysis.

In accordance with one or more embodiments, a FC comprises bipolar plates having multi-scale, multi-layer Turing-pattern microstructures for efficient fluid distribution. Such Turing-pattern microstructures provide for a reduction in size of the FC. Such efficient fluid distribution yields enhanced operational performance in the FC stack by facilitating more uniform cooling of the MEA at the coolant layer. Such uniform cooling, in turn, facilitates more uniform reactions at the MEA, and thus, maximizes the generation of electricity by the FC stack.

In accordance with one or more embodiments, steady-state fluid flow physics is coupled with a chemical reaction model to simulate the multiphysics phenomena inside FC stacks. To reflect the stamped and stacked configuration among the air layer, hydrogen layer, and coolant layer of the FC, their geometric dependency is modeled by assigning design variables to the air layer and the hydrogen layer, with the resulting coolant layer configuration being a function of the design variables of the air layer and the hydrogen layer.

In accordance with one or more embodiments, one or more dehomogenization-based methods comprises implementation of a two-stage design method that comprises an initial porous media optimization stage, and a subsequent de-homogenization stage. The initial porous media optimization stage comprises conducting multi-physics finite element analysis, wherein relatively coarse discretization is used to drastically reduce the computational effort. At the subsequent dehomogenization stage, the domain discretization is refined to extract intricate explicit Turing flow channels.

In accordance with one or more embodiments, one or more dehomogenization-based methods comprises implementation of a flow optimization process with an inverse permeability expression to iteratively design the optimized porous media. This process applies design variables to the air layer and the hydrogen layer, and objective functions to all three layers (i.e., the air layer, the hydrogen layer, and the coolant layer). Thus, in accordance with one or more methods set forth, described, and/or illustrated herein, all three layers are optimized simultaneously.

At the dehomogenization stage, using results from the porous media optimization, anisotropic diffusion coefficient tensors for reaction-diffusion equations are propagated through time to generate one or more Tuning-pattern microstructures for the air layer and the hydrogen layer. The resultant channels are multi-scale in that a larger flow structure interfaces with smaller flow structures.

In accordance with one or more embodiments, after completion of the porous medium optimization stage, Turing-pattern dehomogenization is applied to extract intricate explicit microstructures designs while recovering the optimized porous media performance. While design variables are only assigned to the air layer and the hydrogen layer, based on the stacked configuration of the air layer and the hydrogen layer, the coolant layer configuration is described as a function of design variables in the air layer and the hydrogen layer. The multi-physics equilibrium is governed by partial differential equations (PDEs), which simulate the fluid flow and chemical reaction. The gradient-based optimization of porous medium is guided by solving PDE state variables and conducting sensitivity analysis at each optimization iteration.

Compared with explicit topology optimization methods, the one or more dehomogenization-based methods set forth, described, and/or illustrated herein decouples the numerical mesh/grid resolution required during optimization with the final explicit design. In the porous media optimization stage, where multiphysics finite element analysis is conducted, relatively coarse mesh discretization can be used to drastically reduce the computational effort. In the subsequent dehomogenization stage, the domain mesh discretization is refined to extract intricate explicit channels.

In accordance with one or more embodiments, a fuel cell may comprise one or more of the following: a membrane electrode assembly; a first fuel cell bipolar plate, having a first dehomogenized Turing-pattern microstructure configuration that facilitates flow of a first fluid therethrough; and a second fuel cell bipolar plate having a second dehomogenized Turing-pattern microstructure configuration that facilitates flow of a second fluid therethrough, wherein the first fuel cell bipolar plate and the second fuel cell bipolar plate are spatially arranged in a stacked formation such that the first dehomogenized Turing-pattern microstructure configuration and the second dehomogenized Turing-pattern microstructure configuration are opposed to define a third dehomogenized Turing-pattern microstructure configuration that facilitates flow of a third fluid therethrough.

In accordance with one or more embodiments, a fuel cell may comprise one or more of the following: a membrane electrode assembly; and a pair of opposed fuel cell bipolar plates, each fuel cell bipolar plate having a dehomogenized Turing-pattern microstructure configuration that facilitates flow of fluid therethrough, wherein the fuel cell bipolar plates are spatially arranged in a stacked formation such that the dehomogenized Turing-pattern microstructure configurations are opposed to define a third dehomogenized Turing-pattern microstructure configuration that facilitates flow of a third fluid therethrough.

In accordance with one or more embodiments, a fuel cell may comprise one or more of the following: a membrane electrode assembly; an air fuel cell bipolar plate, having a dehomogenized Turing-pattern air microstructure configuration that facilitates flow of air therethrough; and a hydrogen fuel cell bipolar plate having a dehomogenized Turing-pattern hydrogen microstructure configuration that facilitates flow of hydrogen gas therethrough, wherein the air fuel cell bipolar plate and the hydrogen fuel cell bipolar plate are spatially arranged in a stacked formation such that the dehomogenized Turing-pattern air microstructure configuration and the dehomogenized Turing-pattern hydrogen microstructure configuration are opposed to define a dehomogenized Turing-pattern coolant microstructure configuration that facilitates flow of a coolant therethrough.

A plurality of optimized designs reflecting various designer preferences may be achieved in accordance with one or more of the methods set forth, described and/or illustrated herein. While the proposed framework does not assume any biomimetic layout beforehand, certain optimized designs look and behave similarly as blood vessels and lungs.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The various advantages of the embodiments of the present invention will become apparent to one skilled in the art by reading the following specification and appended claims, and by referencing the following drawings, in which:

FIG. 9A to 9C illustrate the fluid velocity profiles at the air layer, the coolant layer, and the hydrogen layer in an example optimized design of a multi-layer fuel cell, in accordance with one or more embodiments shown and described herein.

FIG. 10A to 10D illustrate dehomogenized Turing microstructure maps at the air layer for different channel lengths, in an example optimized design of a multi-layer fuel cell, in accordance with one or more embodiments shown and described herein.

FIG. 11A to 11D illustrate reaction maps for the different channel lengths illustrated in FIGS. 10A to 10D, in an example optimized design of a multi-layer fuel cell, in accordance with one or more embodiments shown and described herein.

FIG. 12A to 12D illustrate dehomogenized Turing-pattern microstructure maps at the hydrogen layer for the different channel lengths, in an example optimized design of a multi-layer fuel cell, in accordance with one or more embodiments shown and described herein.

DETAILED DESCRIPTION

Figure 1:
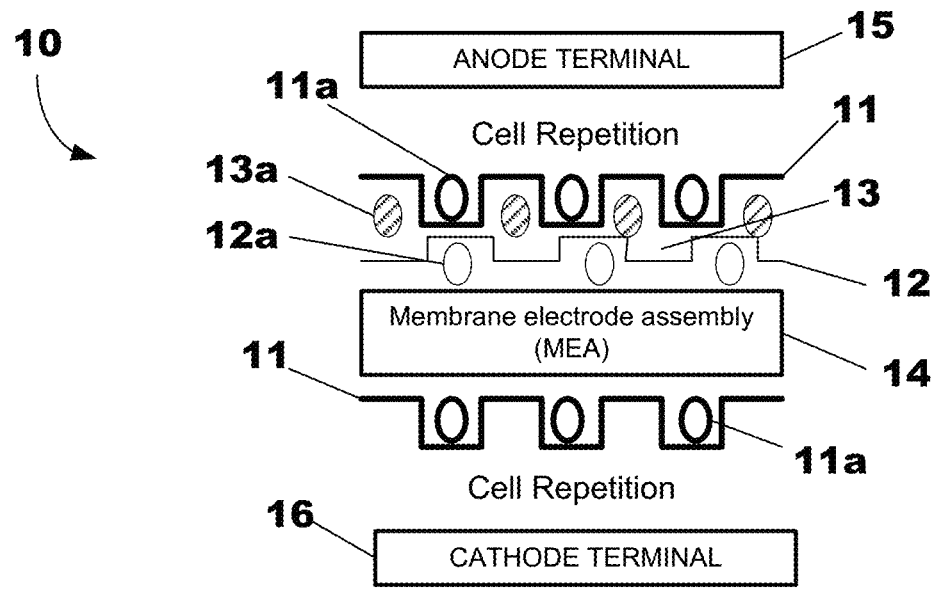
FIG. 1 illustrates a configuration of a stacked FC bipolar plate, in accordance with one or more embodiments shown and described herein.

As illustrated in FIG. 1, a fuel cell 10 comprises a first bipolar plate comprising a first stamped metal plate or layer 11 (serving as the anode), a second stamped metal plate or layer 12 (serving as the cathode), and an MEA membrane 14 interposed therebetween. An anode terminal electrode 15 is electrically connected to the anode 11, while a cathode terminal electrode 16 is electrically connected to the cathode 12.

The first stamped metal plate or layer 11 has a plurality of independently formed air fluid flow network or channels 11a, and the second stamped metal plate or layer 12 has a plurality of independently formed hydrogen fluid flow network or channels 12a. Through the stacking of the first stamped metal plate 11 and the second stamped metal plate 12, a coolant layer 13 comprising a plurality of coolant flow network or channels 13a is defined. In this way, the coolant fluid flow network or channel configuration 13a is dependent upon the independently-formed air channels 11a and hydrogen channels 12a.

The local permeability of the coolant flow network or channels 13a is highest where both the air layer 11 and the hydrogen layer 12 are walls. The local permeability of the coolant flow network or channels 13a is moderate where either the air layer 11 or the hydrogen layer 12 is a channel (or wall). Finally, the local permeability of the coolant flow network or channels 13a is lowest where both the air layer 11 and the hydrogen layer 12 are channels.

The simultaneous design of the air flow network 11a, the hydrogen flow network or channels 12a, and the coolant flow network or channels 13a in FC stacks is formulated as a multi-objective optimization problem.

Figure 2:
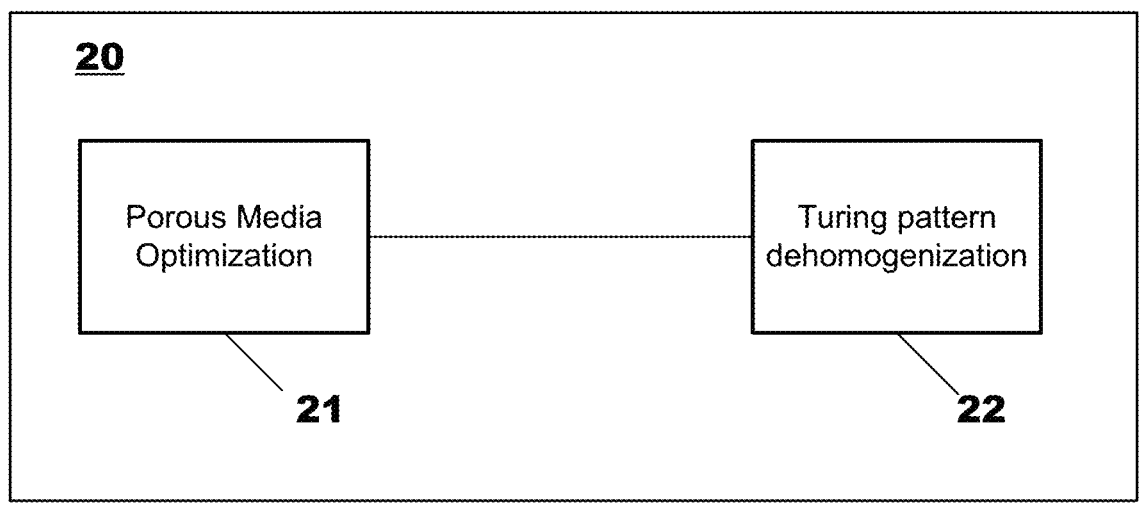
FIG. 2 illustrates a diagram of the method of designing air, hydrogen, and coolant flow networks in FC bipolar plates, in accordance with one or more embodiments shown and described herein.

As illustrated in FIG. 2, in accordance with one or more embodiments, one or more dehomogenization-based methods comprises implementation of a two-stage design process 20 which includes: an initial porous media optimization stage 21 and a Turing pattern de-homogenization stage 22. At the initial porous media optimization stage 21, where multi-physics finite element analysis is conducted, relatively coarse discretization is used to drastically reduce the computational effort. The subsequent Turing pattern de-homogenization stage 22 is then applied to extract intricate explicit fluid flow network or microstructure designs while recovering the optimized porous media performance.

Model Assumptions

To balance the model accuracy and complexity for use of gradient-based optimization, several assumptions are made as follows.

The flow physics of air, hydrogen, and coolant is assumed incompressible and laminar with a low Reynolds number (e.g. <2100).

The simulation model assumes an isothermal system. It is acknowledged that thermal management is a significant topic. Temperature affects various physics inside FC stacks including, e.g., liquid water condensation, fluid flow, and chemical reaction. While the temperature field is not explicitly solved, the thermal management is indirectly considered by defining the coolant flow uniformity objective in the coolant layer 13. The explicit modeling of conjugate heat transfer and its coupling with flow and reaction physics is left for future work.

A chemical reaction is assumed to be dominated by the air supply from the cathode side. The current density is assumed linearly proportional to the oxygen concentration. The hydrogen supply from the anode side is assumed sufficient. The flow uniformity in the hydrogen flow network or channels 11a is set as an objective to support this assumption. It is noted that more comprehensive reaction model, e.g., the Butler-Volmer equation, has been used in related works, which is left for future improvement.

Simulation models require many numerical constants, e.g., reaction rate and diffusion coefficient. The appropriate setting depends on material selection and requires experimental validation, which is not the focus of this paper.

Design Fields

Figure 3A:
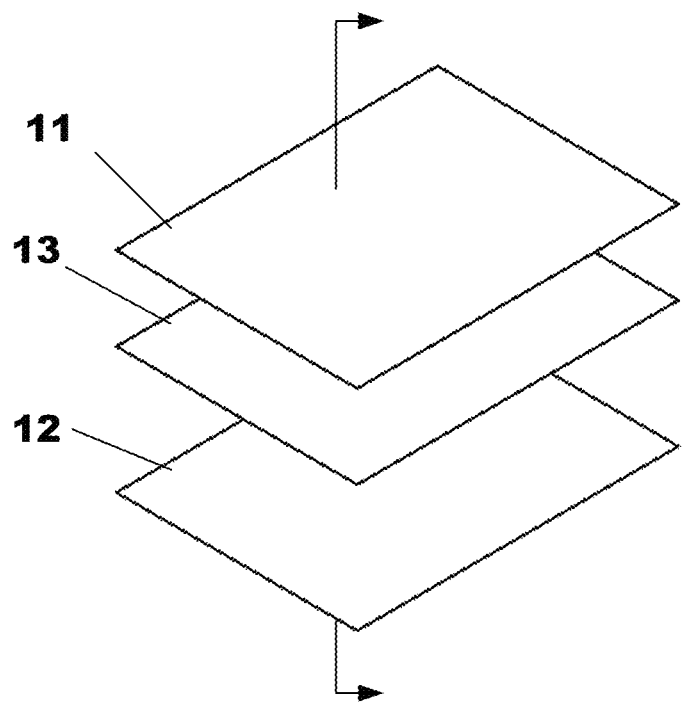
FIGS. 3A and 3B illustrate fluid flow network design fields, in accordance with one or more embodiments shown and described herein.
Figure 3B:
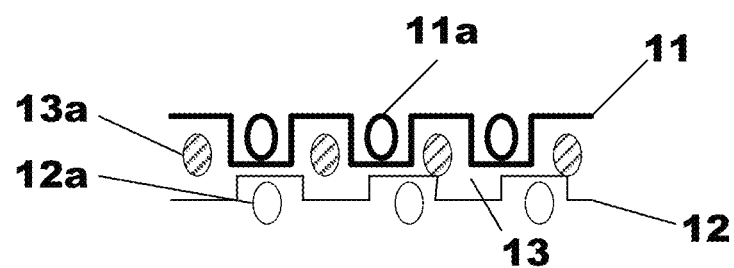

As illustrated in FIGS. 3A and 3B, the simultaneous design of air, hydrogen, and coolant flow networks 11a, 12a, and 13 requires only two design fields in the air layer 11 (design field: ($\phi^{(a)}$) and the hydrogen layer 12 (design field: $\phi^{(h)}$, bounded between −1 and 1. The resulting design of the coolant layer 13 is a by-product of designing the air layer 11 and the hydrogen layer 12, and thus, is determined by $\phi^{(a)}$ and $\phi^{(h)}$.

Design variables are regularized by Helmholtz PDE filters:

$$-r^{(a)2}\nabla^2\tilde{\phi}^{(a)}+\tilde{\phi}^{(a)}=\phi^{(a)} \tag{1a}$$

$$-r^{(h)2}\nabla^2\tilde{\phi}^{(h)}+\tilde{\phi}^{(h)}=\phi^{(h)} \tag{1b}$$

where r(a) and r(h) are filter radii governing the smoothness of the optimized porous media. A smoothed Heaviside projection is used to obtain the regularized design variables $\gamma^{(a)}$ and $\gamma^{(h)}$, ranging between 0 and 1. $\gamma=0$ indicates the lowest porosity (i.e., smallest permeability) whereas $\gamma=1$ indicates the highest porosity (i.e., greatest permeability).

Homogenized permeability

Figure 4A:
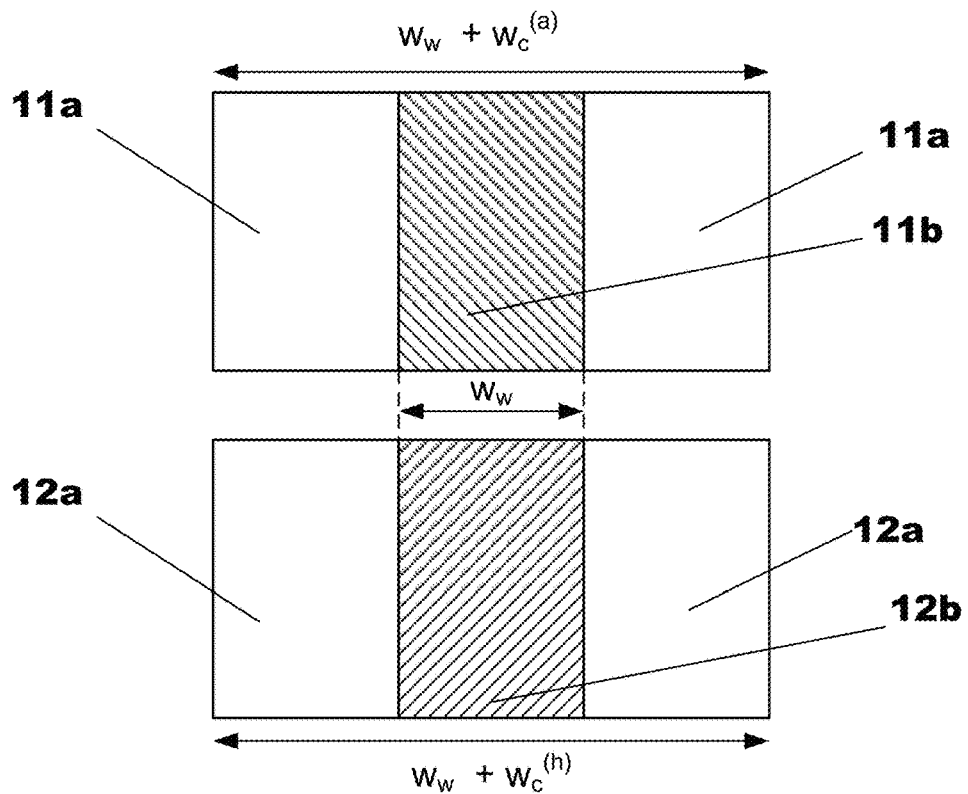
FIGS. 4A to 4C illustrate unit cell microstructure geometries for different layers, in accordance with one or more embodiments shown and described herein.
Figure 4B:
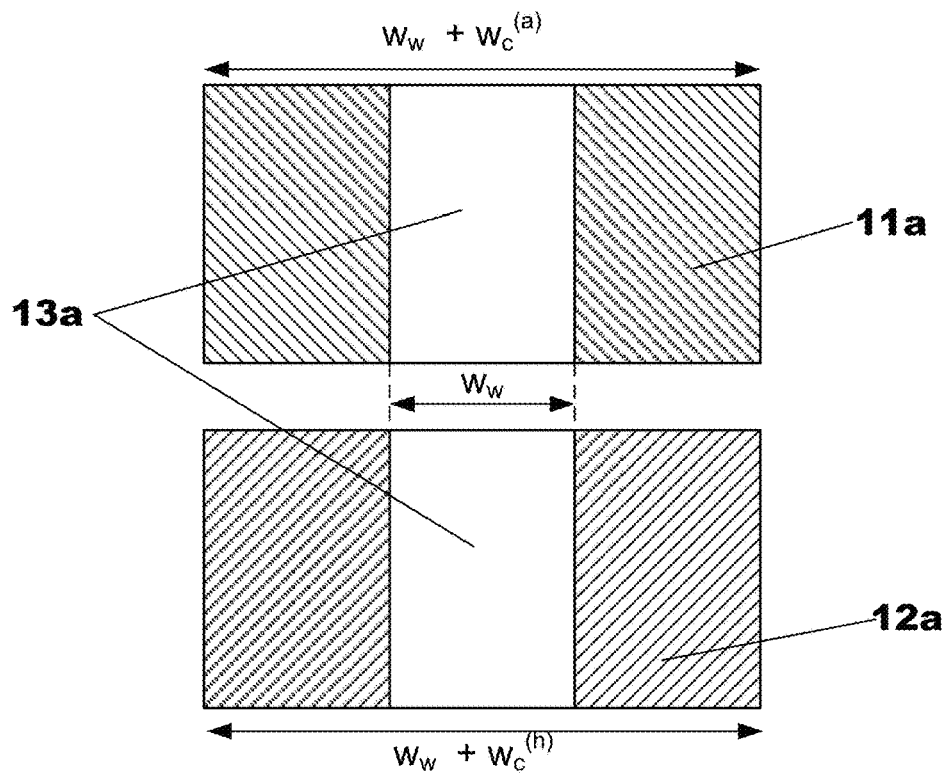
Figure 4C:
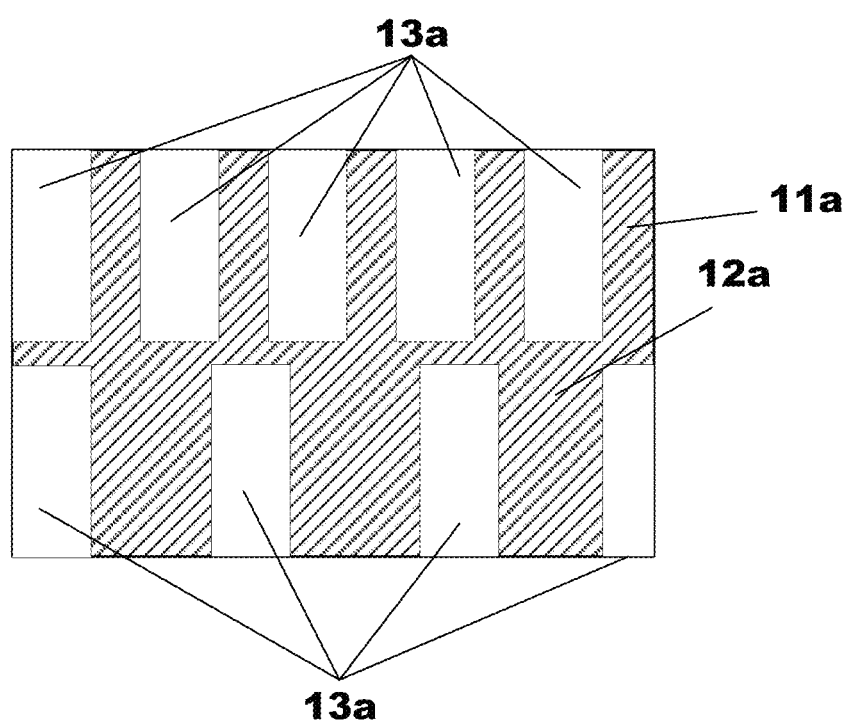

The porous media of the air layer 11 and the hydrogen layer 12 is parameterized with spatially varying microstructure. FIGS. 4A to 4C illustrate unit cell channel geometries for different layers. In both the air layer 11 and the hydrogen layer 12, the wall width is fixed as $w_w$. Their local channel widths are parameterized as $w_c^{(a)}$ and $w_c^{(h)}$, respectively.

The equivalent permeability in the air layer 11 and the hydrogen layer 12 is defined with respect to local channel widths $w_c^{(a)}$ and $w_c^{(h)}$ in two-dimensions (2-D), i.e. assuming infinite out-of-plane length, as follows. Note that this disclosure contemplates other permeability maps or parametrizations based on three-dimensional porous materials.

$$k^{(a)} = \frac{w_c^{(a)3}}{12(w_w + w_c^{(a)})} \tag{2a}$$

$$k^{(h)} = \frac{w_c^{(h)3}}{12(w_w + w_c^{(h)})}, \tag{2b}$$

After stacking, walls 11b in the air layer 11 and walls 12b the hydrogen layer 12 define half-channels 13a in the coolant layer 13. Channels 11a in the air layer 11 and channels 12a in the hydrogen layer 12 define half-walls in the coolant layer 13. Since the air layer 11 and the hydrogen layer 12 are stacked in parallel, and the layer depth effect is not considered due to the 2-D approximation, the resulting equivalent coolant layer permeability is derived in this case as follows:

$$k^{(c,a)} = \frac{w_w^3}{12(w_w + w_c^{(a)})} \quad (3a)$$

$$k^{(c,h)} = \frac{w_w^3}{12(w_w + w_c^{(h)})} \quad (3b)$$

$$k^{(c)} = \frac{k^{(c,a)} + k^{(c,h)}}{2} \quad (3c)$$

where $k^{(c,a)}$ is the coolant layer permeability from the air side, $k^{(c,h)}$ is the coolant layer 13 permeability from the hydrogen side, and $k^{(c)}$ is the combined coolant layer effective permeability.

A linear interpolation function is used to map the regularized design fields $\gamma^{(a)}$ and $\gamma^{(h)}$ to the prescribed minimum and maximum channel widths $w_{c\ min}$ and $w_{c\ max}$ as follows:

$$w_c^{(a)} = w_{c\ min} + (w_{c\ max} - w_{c\ min})\gamma^{(a)} \quad (4a)$$

$$w_c^{(h)} = w_{c\ min} + (w_{c\ max} - w_{c\ min})\gamma^{(h)} \quad (4a)$$

While an identical channel width range is assigned to both the air layer 11 and the hydrogen layer 12, they can be set differently to the extent necessary.

Governing Physics

Based on the aforementioned model assumptions, the governing physics inside FC stacks is simplified to Navier-stokes equations in the air layer 11, the hydrogen layer 12, and the coolant layer 13, with an advection-diffusion-reaction equation in the air layer 11.

The flow physics assuming incompressible laminar flow in porous media is governed by the Navier-stokes equations:

$$\rho^{(n)}(u^{(n)} \cdot \nabla)u^{(n)} = -\nabla p^{(n)} + \nabla \cdot (\mu^{(n)}(\nabla u^{(n)} + (\nabla u^{(n)})^T)) - \mu^{(n)} \alpha^{(n)} u^{(n)} \quad (5)$$

Subject to the continuity equation $\nabla^{(n)} \cdot (u^{(n)}) = 0$, which conserves the mass. Note that n is air, hydrogen, or coolant for the respective layer, and $\rho^{(n)}$, $\mu^{(n)}$, $u^{(n)}$, and $p^{(n)}$ are the corresponding fluid density, fluid dynamic viscosity, fluid velocity (state variables), and pressure (state variables), respectively, and $\alpha^{(n)} = 1/k^{(n)}$ is the effective inverse permeability. As discussed herein, $\alpha^{(a)}$ is a function of $\gamma^{(a)}$, $\alpha^{(h)}$ is a function of $\gamma^{(h)}$, and $\alpha^{(c)}$ is a function of both $\gamma^{(a)}$ and $\gamma^{(h)}$. It is noted that while the channel design in the coolant layer is geometrically coupled with the channel designs in the other two layers, the physics state variables $u^{(n)}$ and $p^{(n)}$ are solved independently for each layer using three sets of Navier-stokes equations.

To model the reaction physics, the solved velocity $u^{(a)}$ from the air layer is fed into an advection-diffusion-reaction equation as follows:

$$\nabla \cdot (-D \nabla c) + u^{(a)} \cdot \nabla c = r \quad (6a)$$

$$r = -\beta c \quad (6b)$$

where c is the concentration (state variables), r is the local reaction rate, assumed linear proportional to the concentration, D is the diffusion coefficient and $\beta$ is the reaction rate coefficient.

In practical FC systems, thermal management and water management are two critical concerns. The resulting temperature distribution across an entire plate is affected by local reaction and coolant flow. Chemical reaction is also sensitive to the operating temperature. The local reaction rate affects the amount of water vapor being generated, which may lead to water droplet condensation and even flooding inside the channels. Since air and water vapor (or water droplets) share the same channel configuration, two-phase flow is often observed inside FC air channels. Such multiphysics phenomena are challenging for numerical simulations, let along design optimization. Model assumptions and simplification are required for use of design optimization, especially gradient-based optimization. The integration of more complicated physics into the current design framework is left for future research. The computational model used in this paper assumes isothermal systems and single-phase flow.

The single-phase flow model disclosed herein is further simplified to be laminar and incompressible. While more comprehensive chemical reaction models, e.g., the Butler-Volmer model, are available, a simplified linear model is used in this paper, which also assumes sufficient hydrogen supply. The integration of turbulent flow physics and more detailed reaction model to the current design framework is also left for future research.

Multiple Objectives

Based on model assumptions and design requirements, five objectives are identified and summarized as follows:

$$f_1 = \int_{D^{(a)}} \beta c \, d\Omega \quad (7a)$$

$$f_2 = \int_{D^{(a)}} \left(\frac{c - c_{avg}}{c_{avg}}\right)^2 d\Omega \quad (7b)$$

$$f_3 = \int_{D^{(a)}} \left(\frac{1}{2}\mu^{(c)} \sum_{i,j} \left(\frac{\partial u_i^{(c)}}{\partial x_j} + \frac{\partial u_j^{(c)}}{\partial x_i}\right)^2 + \mu^{(c)} \sum_i (\alpha^{(c)} u_i^{(c)2})\right) d\Omega \quad (7c)$$

$$f_4 = \int_{S^{(c)}} \left(\frac{|u^{(c)}| - |u^{(c)}|_{avg}}{|u^{(c)}|_{avg}}\right)^2 d\Omega \quad (7d)$$

$$f_5 = \int_{S^{(h)}} \left(\frac{|u^{(h)}| - |u^{(h)}|_{avg}}{|u^{(h)}|_{avg}}\right)^2 d\Omega \quad (7e)$$

where $D^{(n)}$ is the design domain across the entire layer. $S^{(n)}$ is the selected strip domains for evaluating flow uniformity, $|u^{(n)}|$ is the flow velocity magnitude, $|u^{(n)}|_{avg}$ is the average flow velocity magnitude inside selected strip domains, $f_1$ is the (negative) total reaction measure, $f_2$ is the uniform reaction measure, $f_3$ is the coolant flow resistance, and $f_4$ and $f_5$ are the flow uniformity measure in the coolant layer and the hydrogen layer, respectively. Note that not all optimization objective may be used.

Optimization Formulation

As the first step, the porous media optimization problem is formulated as follows:

Minimize: $f = w_1 f_1 + w_2 f_2 + w_3 f_3 + w_4 f_4 + w_5 f_5$, $\phi^{(a)}$, $\phi^{(h)}$ Subject to: $\phi^{(a)} \in [-1,1]^{D^{(a)}}$, $\phi^{(h)} \in [-1,1]^{D^{(h)}}$ (8)

design variable regularization, Eq. (1),
porous media parameterization, Eq. (2-4),
multiphysics equilibrium, Eq. (5 and 6), where the combined multi-objective function is the weighted sum of all objective terms, and $w_i$ is the weighting factor for objective i. Different settings of weighting factors reflect design requirements and preferences, which will lead to different optimized designs. $\phi^{(a)}$ is a design variable assigned to the air layer, and $\phi^{(h)}$ is a design variable assigned to the hydrogen layer. The design variable regularization, porous media parameterization, and multiphysics equilibrium are previously set forth herein.

Turing-Pattern Dehomogenization

As the second step, the intricate explicit channels can be extracted using Turing pattern dehomogenization, which will recover the flow and reaction performance from the prior porous media optimization step.

The time-dependent Turing reaction-diffusion system involves two hypothetical chemical substances $U^{(n)}$ and $V^{(n)}$, which diffuse in the space around and enhance or suppress the reproduction of themselves. The partial differential equation governing this process can be written as follows:

$$\frac{\partial U^{(n)}}{\partial t} = \nabla \cdot D_u^{(n)} \nabla U^{(n)} + R_u^{(n)}(U^{(n)}, V^{(n)}), \quad (9a)$$

$$\frac{\partial U^{(n)}}{\partial t} = \nabla \cdot D_v^{(n)} \nabla U^{(n)} + R_v^{(n)}(U^{(n)}, V^{(n)}), \quad 9(b)$$

where n is air or hydrogen for the respective layer, $R_u^{(n)}$ and $R_v^{(n)}$ are the interactive reaction terms, and $D_u^{(n)}$ and $D_v^{(n)}$ are the diffusion coefficients. The optimized design field $\phi^{(n)}$ is embedded in the extended anisotropic diffusion tensors $D_u^{(n)}$ and $D_v^{(n)}$ to recover the corresponding channel width $w_c^{(n)}$. The fluid velocity $u^{(n)}$ is aligned with the principal axis of the diffusion tensors.

The Turing-pattern dehomogenization process efficiently generates intricate explicit channel designs based on the optimized porous media.

EXAMPLES

Figure 5:
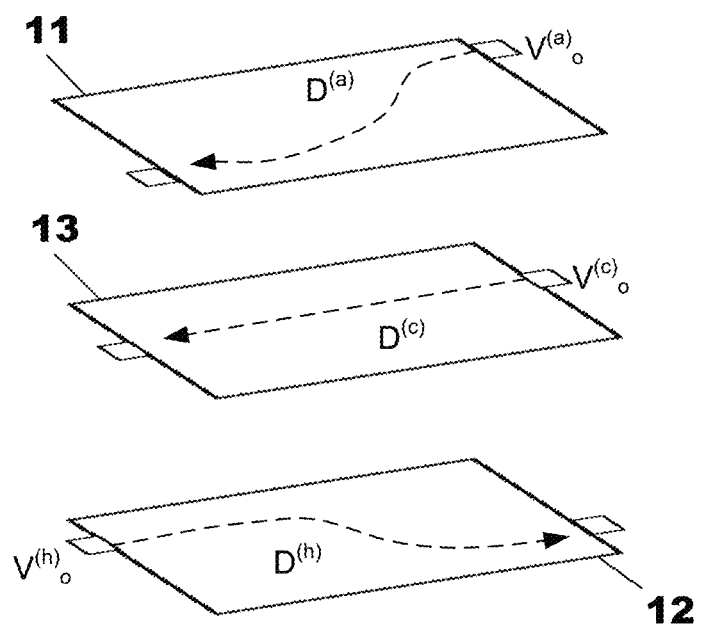
FIG. 5 illustrates example design domain and boundary conditions at different layers, in accordance with one or more embodiments shown and described herein.

To demonstrate the proposed method, a multi-layer FC design example is used. FIG. 5 illustrates an example of design and analysis domains at the air layer 11, the hydrogen layer 12, and the coolant layer 13. Design fields $\phi^{(a)}$ and $\phi^{(h)}$ are assigned to the air domain $D^{(a)}$ and the hydrogen domain $D^{(h)}$. As illustrated in FIG. 5, at the air layer 11, air is supplied from the upper right inlet. At the hydrogen layer 12, hydrogen is supplied from the upper left inlet. Air and hydrogen travel across the entire plate before leaving the system through the outlets located at opposite corners. Such cross-flow configuration is designed to facilitate the mixture of reactants.

At the coolant layer 13, coolant flows in the same direction as the air flow. Coolant enters the FC stack from the middle right inlet, and leaves the system via the middle left outlet. Since the hydrogen supply is often sufficient due to its high concentration, the reaction rate inside FC stacks is dominated by the air supply. As air travels across the plate, the oxygen concentration decreases, which inevitably leads to a non-uniform reaction. As a result, the reaction rate is higher close to the inlet side than the outlet side. By placing the coolant inlet on the same side as the air inlet, the coolant can more effectively cool the region with a higher reaction rate (i.e., higher temperature). In the example, the velocity boundary conditions applied to fluid inlets are $v_o^{(a)}=v_o^{(h)}=0.3$ m/s and $v_o^{(c)}=0.05$ m/s), although this disclosure contemplates the use of higher velocity conditions. Zero pressure is applied to all outlets, and thus, $p^{(a)}=p^{(h)}=p^{(c)}=0$ Pa.

Strip domains may be used to evaluate the flow uniformity inside the coolant layer 13 and the hydrogen layer 12. Examples of the fluid properties are summarized herein in Table 1. It is noted that while the fluid properties, multi-layer design domains, and boundary conditions are designed to resemble FC design configurations, details do not reflect actual commercial designs.

The multi-objective optimization problem in Equation (8) is solved through a combination of a gradient-based, e.g., a method of moving asymptotes (MMA), optimizer with a finite element solver. COMSOL Multiphysics is used to solve physics equilibrium and perform sensitivity analysis. The finite element solver may be used to solve physics equilibrium and perform sensitivity analysis.

TABLE 1

|  | Air | Coolant | Hydrogen |
| --- | --- | --- | --- |
| Density (kg/m$^3$]) | 1.847 | 979.465 | 0.0899 |
| Viscosity (Pa · s) | 2.11e−5 | 7.10e−4 | 8.34e−7 |

Example Baseline Design

FIGS. 6A to 6F illustrate, the performance of FC stacks of a baseline design that yields uniformly-spaced Turing-pattern channels.

Figure 6A:
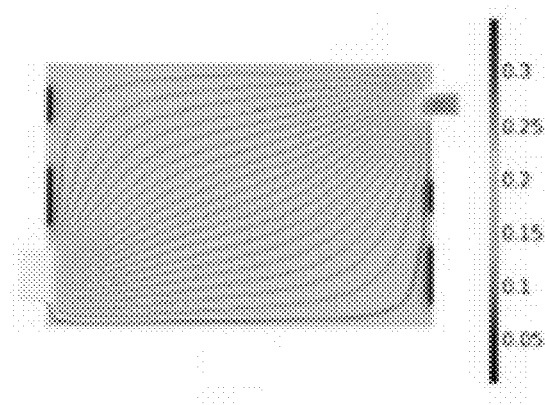
FIGS. 6A to 6F illustrate the performance of FC stacks of an example baseline design, in accordance with one or more embodiments shown and described herein.
Figure 6B:
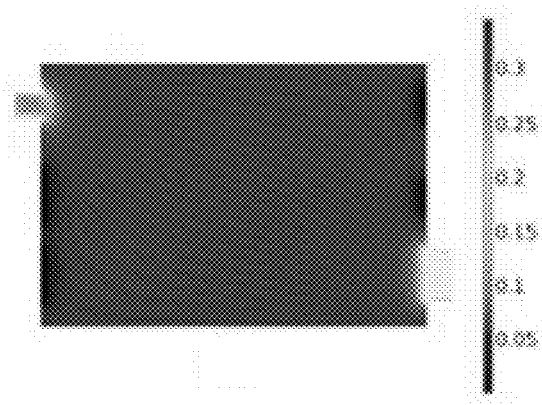

As illustrated in FIGS. 6A and 6B, the relative effective permeability and simulated flow velocity of the air layer and the hydrogen layer is achieved by applying uniform porosity to the air layer and the hydrogen layer. The darkness indicates relative permeability, brighter colors indicates higher permeability, and darker colors indicates lower permeability.

Figure 6C:
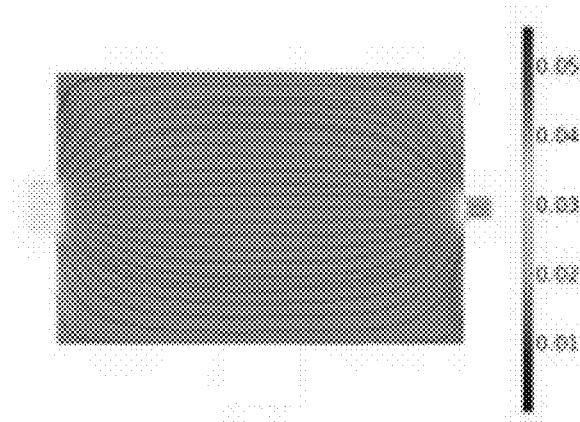

As illustrated in FIG. 6C, the relative permeability of the porous media coolant layer is derived from stacking the air layer and the hydrogen layer. Since both the air layer and the hydrogen layer have uniform permeability, the permeability in the resultant coolant layer is also uniform.

Figure 6D:
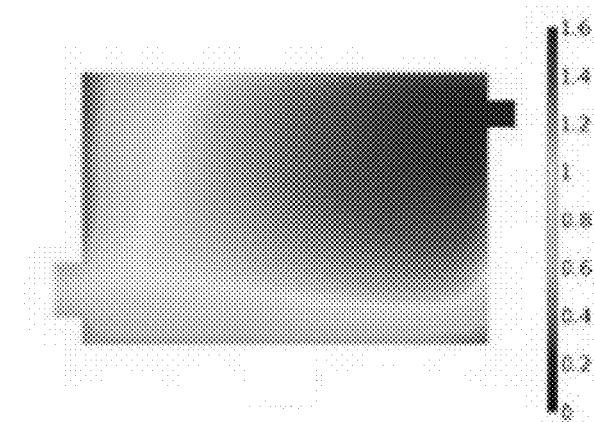

As illustrated in FIG. 6D, the simulated oxygen concentration is presented in FIG. 6D using the air layer configuration. This method assumes reaction is dominated by the air supply, and the reaction rate is linearly proportional to the oxygen concentration. As a result, the oxygen concentration map also describes the reaction rate across the entire plate. It is observed that local reaction rate is higher close to the upper right air inlet. The reaction rate drops as the air travels across the plate. Since air supply is not sufficient in left and bottom edges, the reaction rate is the lowest.

Figure 6E:
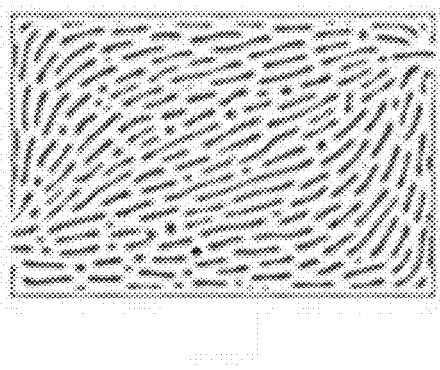
Figure 6F:
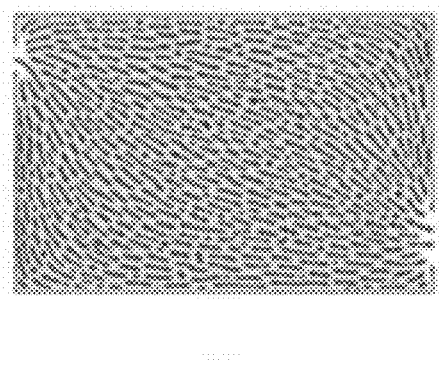

FIGS. 6E and 6F respectively illustrate the dehomogenized Turing-pattern channel designs of the air layer and the hydrogen layer. The illustrated example illustrates that the walls and channels are uniformly spaced. The pitch of the air channel design is greater than the pitch of the hydrogen channel design. This corresponds to the relative porous media permeability illustrated in FIGS. 6A and 6B. The Turing-pattern coolant channel design is obtained from stacking the Turing-pattern channel design of the air layer and the Turing-pattern channel design of the hydrogen layer.

Example Optimized Design I

FIGS. 7A to 7F illustrate, the performance of FC stacks of an example optimized design having balanced weighting factors. Design fields were uniformly initialized as the baseline design previously described. By normalizing each objective term $f_i$ with respect to the initialization design objective values (i.e., baseline design performance), and assigning equal weighting factors wi to the multi-objective function, the optimized design is presented.

Figure 7A:
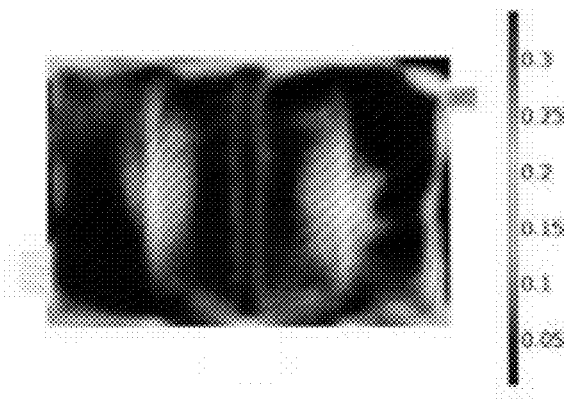
FIGS. 7A to 7F illustrate the performance of FC stacks of a first example optimized design, in accordance with one or more embodiments shown and described herein.
Figure 7B:
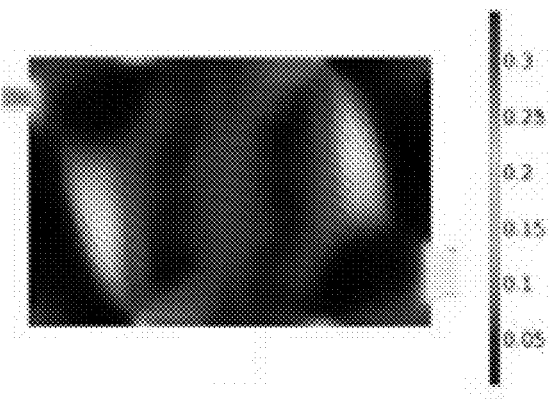
Figure 7C:
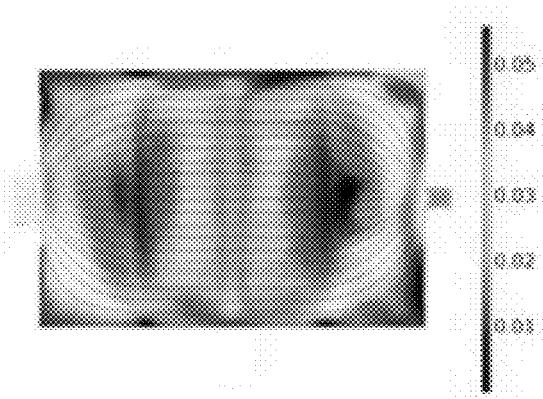
Figure 7D:
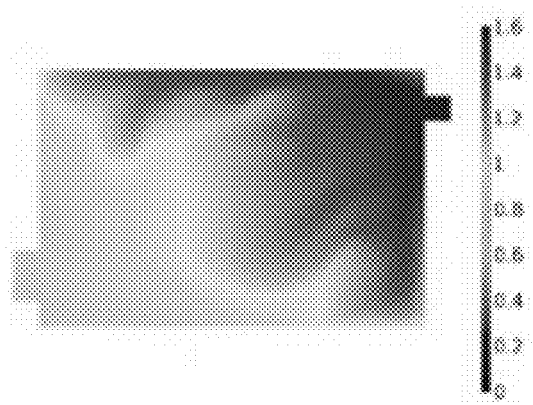
Figure 7E:
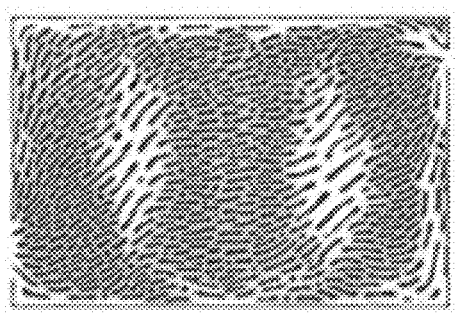
Figure 7F:
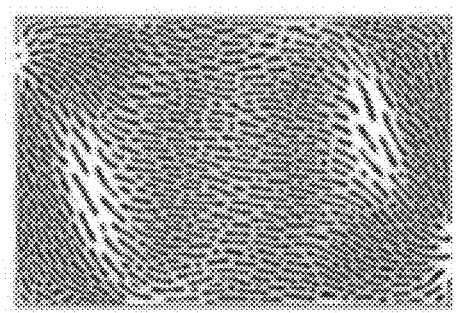

FIGS. 7A and 7B illustrate an optimized porous media for the air layer and the hydrogen layer. The resultant coolant layer design is illustrated in FIG. 7C. In the optimized air layer porous media, more permeable paths are generated on the edges to more effectively supply oxygen reactant to corner regions. The effect can be seen from the oxygen concentration map in FIG. 7D. Compared with the baseline design, corner low reaction rate regions have been eliminated. The lowest oxygen concentration across the entire plate is higher than that of the baseline design. In the optimized hydrogen layer porous media, more permeable media are distributed to the far end of the inlet and outlet. Such optimized design contributes to the improvement of flow uniformity, which is evaluated at the center three strip domains (See, FIG. 5B). The resultant coolant layer porous media are almost symmetric. The symmetric permeability distribution contributes to the coolant flow uniformity. Since the hydrogen layer porous media design is not symmetric, in order to achieve the symmetry pattern in the coolant layer, two islands of more permeable media are generated in the air layer accordingly. The dehomogenized Turing-pattern channel designs for the air layer and the hydrogen layer, which recover the permeability distribution of the corresponding optimized porous media are illustrated in FIGS. 7E and 7F.

Example Optimized Design II

Figure 8A:
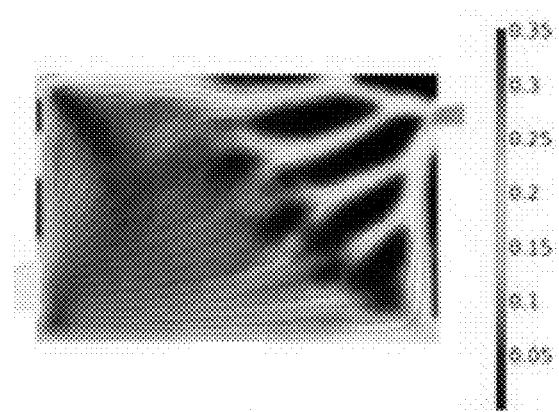
FIGS. 8A to 8D illustrate the performance of FC stacks of a second example optimized design, in accordance with one or more embodiments shown and described herein.
Figure 8B:
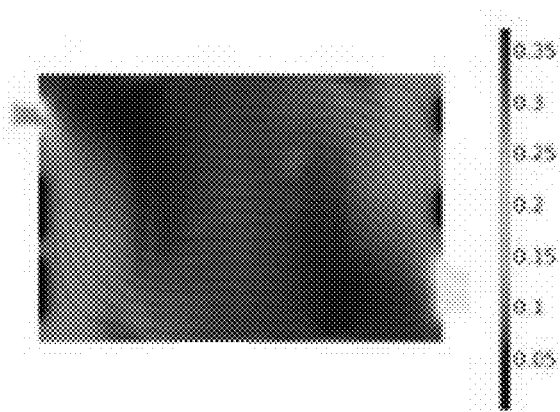
Figure 8C:
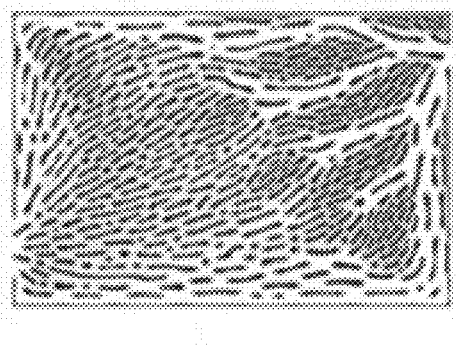
Figure 8D:
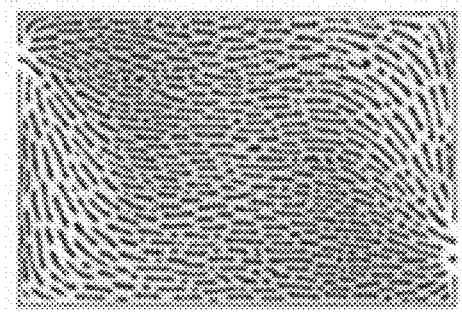

FIGS. 8A to 8D illustrate the performance of FC stacks of another example optimized design of porous media for the air layer and the hydrogen layer (FIG. 8A and 8B), and the corresponding Turing-pattern dehomogenized channels (FIG. 8C and 8D). This second optimized design further explores the tradeoffs among competing objectives, one which prioritizes the reaction uniformity ($f_2$) and the flow uniformity ($f_5$) in the hydrogen layer. After proper objective normalization, the weighting factors $w_2$ and $w_5$ are assigned to 1, while others are assigned to 1e-3. This example optimized air layer design comprises multi-scale channels in which larger flow structures interface with smaller flow structures. While the inverse design framework does not assume any biomimetic layout beforehand, the optimized design have characteristics similar to the hierarchical channel nature of blood vessels in a cardiovascular system.

Dehomogenization

FIGS. 9A to 9C illustrate the fluid velocity profiles at the air layer, the coolant layer, and the hydrogen layer in an example optimized design of a multi-layer fuel cell.

FIG. 10A to 10D illustrate dehomogenized Turing-pattern channel maps at the air layer for discrete channel lengths (FIG. 10B), more continuous channel lengths (FIG. 10C), and continuous plus channel lengths (FIG. 10D). Note that the x-direction dimension of each structure illustrated in the figures is compressed to fit the page.

FIG. 11A to 11D illustrate reaction maps at the air layer for discrete channel lengths (FIG. 11B), more continuous channel lengths (FIG. 11C), and continuous plus channel lengths (FIG. 11D). Note that the x-direction dimension of each structure illustrated in the figures is compressed to fit the page.

FIG. 12A to 12D illustrate dehomogenized Turing-pattern microstructure maps at the hydrogen layer for discrete channel lengths (FIG. 12B), more continuous channel lengths (FIG. 12C), and continuous plus channel lengths (FIG. 12D). Note that the x-direction dimension of each structure illustrated in the figures is compressed to fit the page.

Figure 13A:
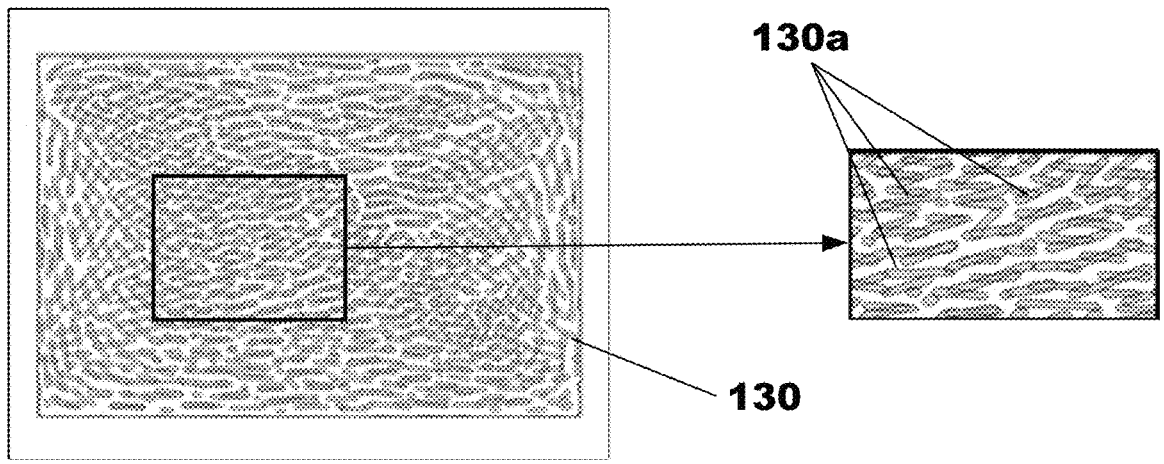
FIGS. 13A to 13C illustrate channel connectivity at the coolant layer for different channel lengths in the air and hydrogen layers, in an example optimized design of a multi-layer fuel cell, in accordance with one or more embodiments shown and described herein.
Figure 13B:
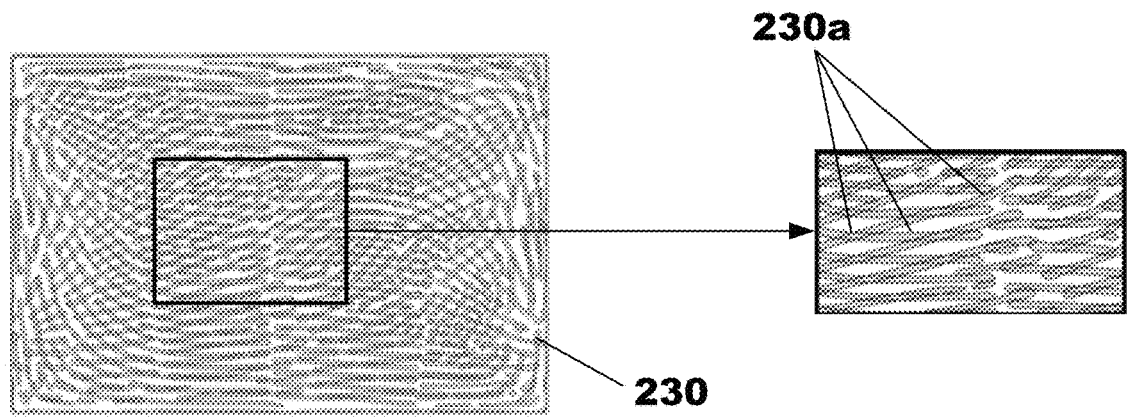
Figure 13C:
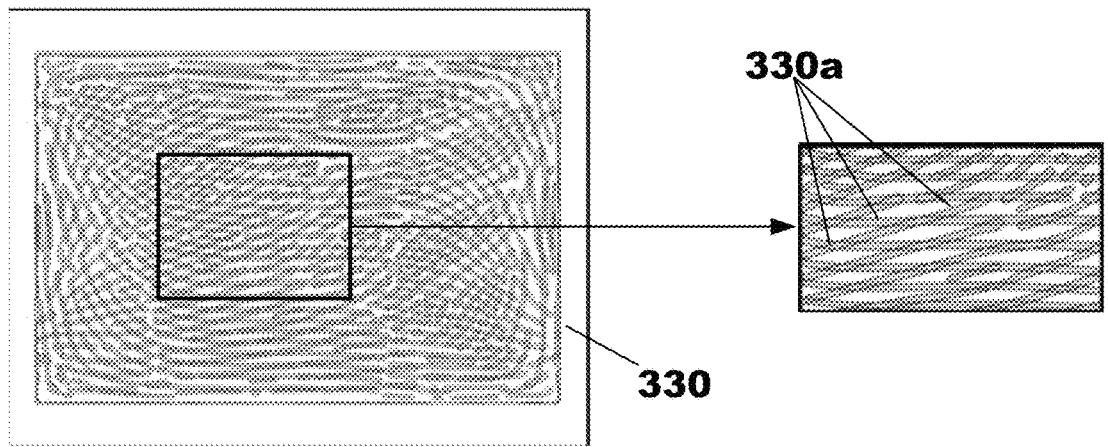

As illustrated in FIGS. 13A to 13C, in accordance with one or more embodiments, channel connectivity been coolant channels 130a, 230a, 330a in the coolant layer 130, 230, 330 improves with use of more continuous dehomogenization in the air layer and the hydrogen layer when comparing discrete channel lengths (FIG. 13A), more continuous channel lengths (FIG. 13B), and continuous plus channel lengths (FIG. 13C).

Methods

Figure 14:
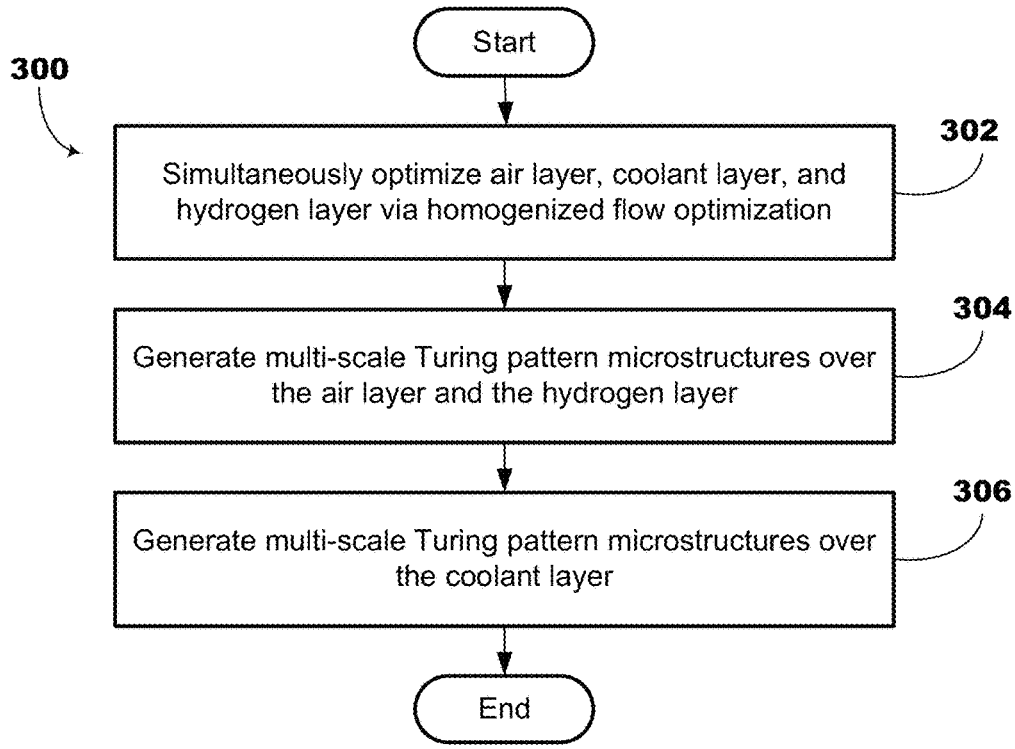
FIG. 14 illustrates a schematic diagram of an example of a method of designing fluid flow networks in a FC bipolar plate, in accordance with one or more embodiments shown and described herein.
Figure 15:
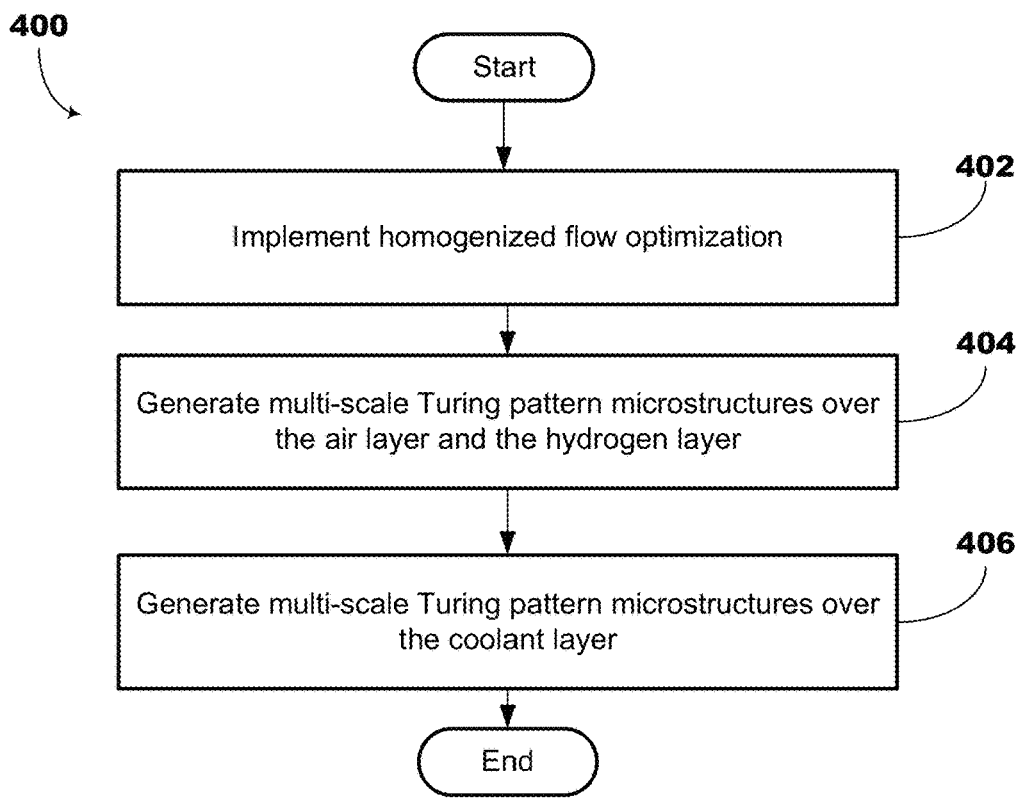
FIG. 15 illustrates a schematic diagram of an example of a method of designing fluid flow networks in a FC bipolar plate, in accordance with one or more embodiments shown and described herein.

FIGS. 14 and 15 illustrates flowcharts of methods 300, 400 for designing fluid flow networks for a FC bipolar plate, in accordance with embodiments. Each dehomogenization-based method is to yield an optimized design of a FC bipolar having channel configurations that reduce the overall size of the FC. Moreover, each method is to yield an optimized design of a FC bipolar having enhanced operational performance by facilitating more uniform cooling of the MEA at the cooling layer. Such uniform cooling, in turn, facilitates more uniform reactions at the MEA that in turn, maximizes the generation of electricity by the FC stack.

The flowchart of each respective method 300, 400 corresponds to the schematic illustrations of the method illustrated in FIG. 2 which is set forth and described herein. In accordance with embodiments, each method 300, 400 may be implemented, for example, using logic instructions (e.g., software), configurable logic, fixed-functionality hardware logic, etc., or any combination thereof. As an example, software executed on one or more computer systems may provide functionality described or illustrated herein. Each computing system respectively includes one or more processors. In particular, software executing on one or more computer systems may perform one or more fabrication or processing blocks of each method 300, 400 described or illustrated herein or provides functionality described or illustrated herein.

As illustrated in FIG. 14, in the method 300, illustrated processing block 302 includes simultaneously optimizing, via homogenized flow optimization, the air layer, the hydrogen layer, and the coolant layer.

Simultaneously optimizing may comprise assigning design variables to only the air layer and the hydrogen layer based on a stacked configuration of the air layer and the hydrogen layer. Alternatively or additionally, simultaneously optimizing may comprise describing configuration of the coolant layer as a function of design variables in the air layer and the hydrogen layer. Alternatively or additionally, simultaneously optimizing may comprise assigning objective functions to the air layer, the hydrogen layer, and the coolant layer. Alternatively or additionally, homogenized flow optimization may comprise applying an inverse permeability expression to iteratively design a porous fluid flow structure for the air layer, the hydrogen layer, and the coolant layer.

The method 300 may then proceed to illustrated process block 304, which includes generating, in response to the optimizing, multi-scale Turing-pattern microstructures over the air layer and the hydrogen layer to define a coolant layer.

Generating the multi-scale Turing-pattern microstructures may comprise propagating, using results from the homogenized flow optimization, anisotropic diffusion coefficient tensors for reaction-diffusion equations through time to generate one or more Turing-pattern microstructures for the air layer and the hydrogen layer. The resultant channels are multi-scale in that a larger flow structure interfaces with smaller flow structures.

The method 300 may then proceed to illustrated process block 306, which includes generating, in response to the generate one or more Turing-pattern microstructures for the air layer and the hydrogen layer, one or more Turing-pattern microstructures for the coolant layer. The resultant channels are multi-scale in that a larger flow structure interfaces with smaller flow structures. The method 300 can then terminate or end after completion of process block 306.

As illustrated in FIG. 15, in the method 400, illustrated processing block 402 includes implementing hom5ogenized flow optimization by applying an inverse permeability expression to iteratively design a porous fluid flow structure for an air layer, a hydrogen layer, and a coolant layer of the fuel cell.

Implementing homogenized flow optimization may comprise assigning design variables to only the air layer and the hydrogen layer based on a stacked configuration of the air layer and the hydrogen layer. Alternatively or additionally, implementing homogenized flow optimization may comprise describing configuration of the coolant layer as a function of design variables in the air layer and the hydrogen layer. Alternatively or additionally, implementing homogenized flow optimization may comprise assigning objective functions to the air layer, the hydrogen layer, and the coolant layer.

The method 400 may then proceed to illustrated process block 404, which includes generating, in response to the optimizing, multi-scale Turing-pattern microstructures over the air layer and the hydrogen layer to define a coolant layer. Generating the multi-scale Turing-pattern microstructures may comprise propagating, using results from the homogenized flow optimization, anisotropic diffusion coefficient tensors for reaction-diffusion equations through time to generate one or more Turing-pattern microstructures for the air layer and the hydrogen layer. The resultant channels are multi-scale in that a larger flow structure interfaces with smaller flow structures.

The method 400 may then proceed to illustrated process block 406, which includes generating, in response to the generate one or more Turing-pattern microstructures for the air layer and the hydrogen layer, one or more Turing-pattern microstructures for the coolant layer. The resultant channels are multi-scale in that a larger flow structure interfaces with smaller flow structures. The method 400 can then terminate or end after completion of process block 406.

Fuel Cell

Figure 16:
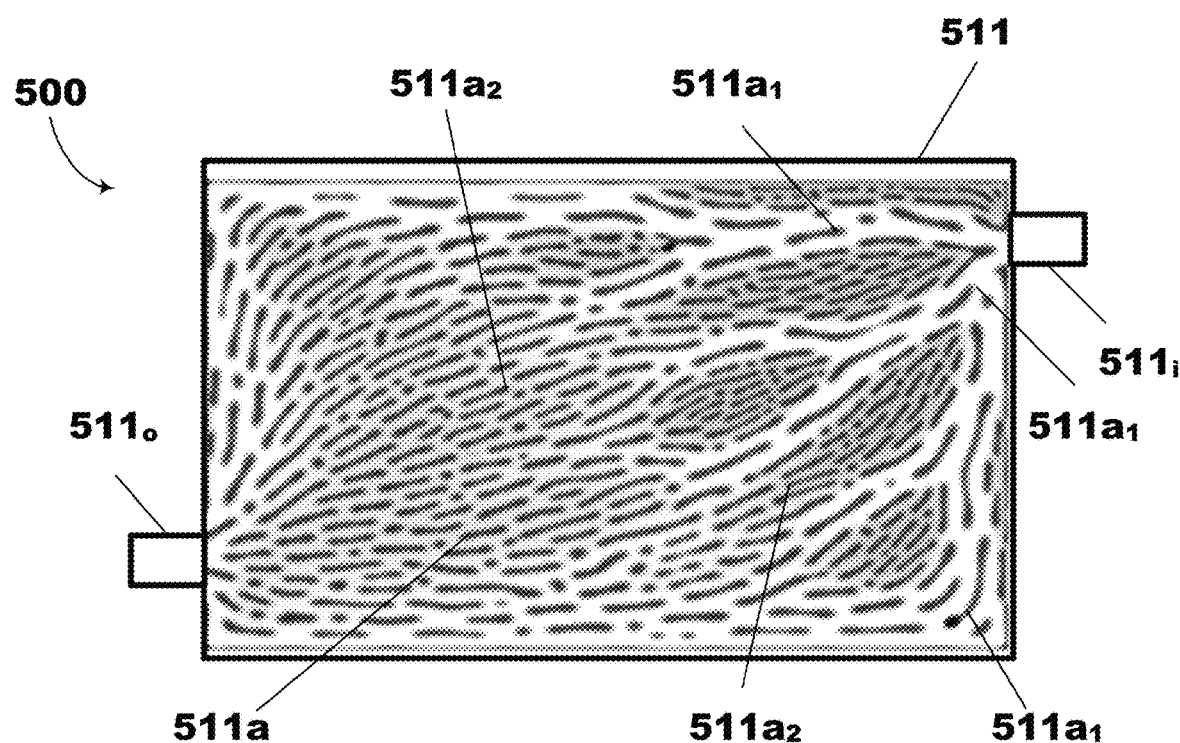
FIG. 16 illustrates an example Turing-pattern microstructure configuration for an air FC bipolar plate of a fuel cell assembly, in accordance with one or more embodiments shown and described herein.

FIG. 16 illustrates an example design 500 of a biomimetic or Turing-pattern microstructure configuration 511a for an air FC bipolar plate 511 of a fuel cell assembly. The Turing-pattern microstructure configuration 511a, designed in accordance with the one or more methods set forth, described, and/or illustrated herein, is provided on a surface of the air FC bipolar plate 511. The Turing-pattern microstructure configuration 511a comprises a plurality of large air channels $511a_1$ extending from an air inlet $511_i$ for fluidic connection to a plurality of smaller air channels $511a_2$ in a dendritic manner. As used herein, the term "larger" is to mean a channel(s) having a channel width and/or length that is greater than that of another channel. As also used herein, the term "smaller" is to mean the channel(s) has a channel width and/or length that is less than that of another channel.

In the illustrated example, beginning at the air inlet $511_i$, the large air channels $511a_1$ extend (from right to left in the drawing figure) toward a middle region of the air fuel cell bipolar plate 511, and transition into the smaller air channels $511a_2$ along a diagonal line of the air fuel cell bipolar plate towards the air inlet $511_o$. The smaller air channels $511a_2$ converge to terminate at the air inlet $511_o$. The example design 500 is to evenly distribute air across the air FC bipolar plate 511 in the fuel cell.

Figure 17:
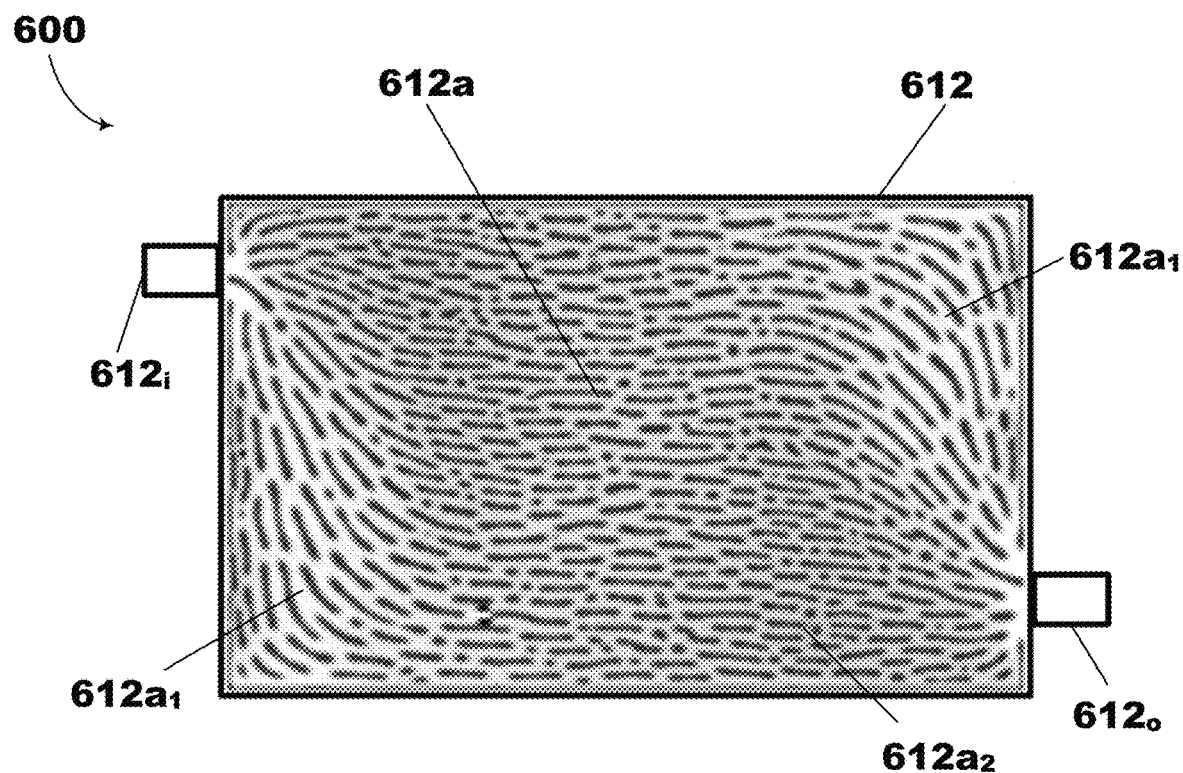
FIG. 17 illustrates an example Turing-pattern microstructure configuration for a hydrogen FC bipolar plate of a fuel cell assembly, in accordance with one or more embodiments shown and described herein.

FIG. 17 illustrates an example design 600 of a biomimetic or Turing-pattern microstructure configuration 612a for a hydrogen FC bipolar plate 612 of a fuel cell assembly. The Turing-pattern microstructure configuration 612a, designed in accordance with the one or more methods set forth, described, and/or illustrated herein, is provided on a surface of the hydrogen FC bipolar plate 612. The Turing-pattern microstructure configuration 612a comprises a plurality of large hydrogen channels $612a_1$ extending along side edges of the hydrogen fuel cell bipolar plate 612 for fluidic connection to a plurality of smaller hydrogen channels $612a_2$ in a dendritic manner.

In the illustrated example, the smaller hydrogen channels $612a_2$ extend (from left to right in the drawing figure) from the large hydrogen channels $612a_1$ adjacent to the hydrogen inlet $612_i$ and across the hydrogen fuel cell bipolar plate 612 towards the larger hydrogen channels $612a_1$ that are adjacent to the side edges of the hydrogen fuel cell bipolar plate 612 adjacent to the hydrogen outlet $612_o$. The larger hydrogen channels $612a_1$ and the smaller hydrogen channels $612a_2$ converge to terminate at the air hydrogen outlet $511_o$. The example design 600 is to evenly distribute hydrogen across the hydrogen FC bipolar plate 612 in the fuel cell.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A fuel cell, comprising:
   a membrane electrode assembly;
   a first fuel cell bipolar plate, having a first dehomogenized Turing-pattern microstructure configuration that facilitates flow of a first fluid along, through, and contacting the first dehomogenized Turing-pattern microstructure configuration; and
   a second fuel cell bipolar plate, having a second dehomogenized Turing-pattern microstructure configuration that facilitates flow of a second fluid along, through, and contacting the second dehomogenized Turing-pattern microstructure configuration,
   wherein the first fuel cell bipolar plate and the second fuel cell bipolar plate are spatially arranged in a stacked formation such that the first dehomogenized Turing-pattern microstructure configuration and the second dehomogenized Turing-pattern microstructure configuration are opposed to define a third dehomogenized Turing-pattern microstructure configuration that includes at least one channel that facilitates flow of a third fluid along, through, and directly contacting the third dehomogenized Turing-pattern microstructure configuration so as to directly contact the first fuel cell bipolar plate and the second fuel cell bipolar plate plate,
   wherein one of the first fuel cell bipolar plate and the second fuel cell bipolar plate comprises an anode,
   wherein the other of the first fuel cell bipolar plate and the second fuel cell bipolar plate comprises a cathode, and wherein the first Turing-pattern microstructure configuration comprises a plurality of large air channels extending from an air inlet of the air fuel cell bipolar plate for fluidic connection to a plurality of smaller air channels in a dendritic arrangement, and the plurality of large air channels extend toward a middle region of the air fuel cell bipolar plate, and transition into the plurality of smaller air channels along a diagonal line of the air fuel cell bipolar plate.

2. A fuel cell, comprising:
a membrane electrode assembly;
a first fuel cell bipolar plate, having a first dehomogenized Turing-pattern microstructure configuration that facilitates flow of a first fluid along, through, and contacting the first dehomogenized Turing-pattern microstructure configuration; and
a second fuel cell bipolar plate, having a second dehomogenized Turing-pattern microstructure configuration that facilitates flow of a second fluid along, through, and contacting the second dehomogenized Turing-pattern microstructure configuration,
wherein the first fuel cell bipolar plate and the second fuel cell bipolar plate are spatially arranged in a stacked formation such that the first dehomogenized Turing-pattern microstructure configuration and the second dehomogenized Turing-pattern microstructure configuration are opposed to define a third dehomogenized Turing-pattern microstructure configuration that includes at least one channel that facilitates flow of a third fluid along, through, and directly contacting the third dehomogenized Turing-pattern microstructure configuration so as to directly contact the first fuel cell bipolar plate and the second fuel cell bipolar plate,
wherein the second fuel cell bipolar plate comprises a hydrogen fuel cell bipolar plate. and the second fluid comprises hydrogen gas, and
wherein: the second Turing-pattern microstructure configuration comprises a plurality of large hydrogen channels extending along side edges of the hydrogen fuel cell bipolar plate for fluidic connection to a plurality of smaller hydrogen channels in a dendritic arrangement, and the plurality of large hydrogen channels branch along the side edges of the hydrogen fuel cell bipolar plate such that the plurality of smaller hydrogen channels extend across to the plurality of large hydrogen channels that are adjacent to the side edges of the hydrogen fuel cell bipolar plate at the hydrogen outlet.

3. A fuel cell, comprising:
a membrane electrode assembly:
a first fuel cell bipolar plate, having a first dehomogenized Turing-pattern microstructure configuration that facilitates flow of a first fluid along, through, and contacting the first dehomogenized Turing-pattern microstructure configuration; and
a second fuel cell bipolar plate, having a second dehomogenized Turing-pattern microstructure configuration that facilitates flow of a second fluid along, through, and contacting the second dehomogenized Turing-pattern microstructure configuration,
wherein the first fuel cell bipolar plate and the second fuel cell bipolar plate are spatially arranged in a stacked formation such that the first dehomogenized Turing-pattern microstructure configuration and the second dehomogenized Turing-pattern microstructure configuration are opposed to define a third dehomogenized Turing-pattern microstructure configuration that includes at least one channel that facilitates flow of a third fluid along, through, and directly contacting the third dehomogenized Turing-pattern microstructure configuration so as to directly contact the first fuel cell bipolar plate and the second fuel cell bipolar plate,
wherein the third fluid comprises a coolant, and
wherein the third Turing-pattern microstructure configuration comprises a plurality of large coolant channels extending adjacent to a coolant inlet for fluidic connection to a plurality of smaller coolant channels, and the plurality of smaller coolant channels linearly extend across the air fuel cell bipolar plate and the hydrogen fuel cell bipolar plate to a plurality of large coolant channels extending adjacent to a coolant outlet.

4. A fuel cell, comprising:
a membrane electrode assembly; and
a pair of opposed fuel cell bipolar plates, each fuel cell bipolar plate having a dehomogenized Turing-pattern microstructure configuration that facilitates flow of fluid along, through, and contacting the dehomogenized Turing-pattern microstructure configuration,
wherein the fuel cell bipolar plates are spatially arranged in a stacked formation such that the dehomogenized Turing-pattern microstructure configurations are opposed to define a third dehomogenized Turing-pattern microstructure configuration that includes at least one fluid channel that facilitates flow of a third fluid along, through, and directly contacting the third dehomogenized Turing-pattern microstructure configuration so as to directly contact the each of the pair of opposed fuel cell bipolar plates,
wherein one of the fuel cell bipolar plates comprises an anode,
wherein the other of the fuel cell bipolar plates comprises a cathode, and
wherein the air fuel cell bipolar plate has a Turing-pattern microstructure configuration that facilitates the flow of air therethrough as a fuel reactant, the Turing-pattern microstructure configuration comprising a plurality of large air channels extending from an air inlet of the air fuel cell bipolar plate for fluidic connection to a plurality of smaller air channels in a dendritic arrangement.

5. The fuel cell of claim 4, wherein the plurality of large air channels extend toward a middle region of the air fuel cell bipolar plate, and transition into the plurality of smaller air channels along a diagonal line of the air fuel cell bipolar plate.

6. The fuel cell of claim 4, wherein the third Turing-pattern microstructure configuration facilitates the flow of a coolant therethrough for thermal management of the fuel cell, the third Turing-pattern microstructure configuration comprising a plurality of large coolant channels extending adjacent to a coolant inlet for fluidic connection to a plurality of smaller coolant channels.

7. The fuel cell of claim 6, wherein the plurality of smaller coolant channels linearly extend across the air fuel cell bipolar plate and the hydrogen fuel cell bipolar plate to a plurality of large coolant channels extending adjacent to a coolant outlet.

8. A fuel cell, comprising:
a membrane electrode assembly; and
a pair of opposed fuel cell bipolar plates, each fuel cell bipolar plate having a dehomogenized Turing-pattern microstructure configuration that facilitates flow of fluid along, through, and contacting the dehomogenized Turing-pattern microstructure configuration, wherein the fuel cell bipolar plates are spatially arranged in a stacked formation such that the dehomogenized Turing-pattern microstructure configurations are opposed to define a third dehomogenized Turing-pattern microstructure configuration that includes at least one fluid channel that facilitates flow of a third fluid along, through, and directly contacting the third dehomogenized Turing-pattern microstructure configuration so as to directly contact the each of the pair of opposed fuel cell bipolar plates, wherein one of the fuel cell bipolar plates comprises an anode, wherein the other of the fuel cell bipolar plates comprises a cathode, and wherein the hydrogen fuel cell bipolar plate has a Turing-pattern microstructure configuration that facilitates the flow of hydrogen therethrough as a fuel reactant, the Turing- pattern microstructure configuration comprising a plurality of large hydrogen channels extending along side edges of the hydrogen fuel cell bipolar plate for fluidic connection to a plurality of smaller hydrogen channels in a dendritic manner.

9. The fuel cell of claim 8, wherein the plurality of large hydrogen channels branch along the side edges of the hydrogen fuel cell bipolar plate such that the plurality of smaller hydrogen channels extend across to the plurality of large hydrogen channels that are adjacent to the side edges of the hydrogen fuel cell bipolar plate at the hydrogen outlet.

10. A fuel cell, comprising:
a membrane electrode assembly;
an air fuel cell bipolar plate, having a dehomogenized Turing-pattern air microstructure configuration that facilitates flow of air along, through, and contacting the dehomogenized Turing-pattern air microstructure configuration; and
a hydrogen fuel cell bipolar plate having a dehomogenized Turing-pattern hydrogen channel configuration that facilitates flow of hydrogen gas along, through, and contacting the dehomogenized Turing-pattern hydrogen channel configuration,
wherein the air fuel cell bipolar plate and the hydrogen fuel cell bipolar plate are spatially arranged in a stacked formation such that the dehomogenized Turing-pattern air microstructure configuration and the dehomogenized Turing-pattern hydrogen microstructure configuration are opposed to define a dehomogenized Turing-pattern coolant microstructure configuration that includes at least one fluid channel that that facilitates flow of a coolant along, through, and directly contacting the dehomogenized Turing-pattern coolant microstructure configuration so as to directly contact the air fuel cell bipolar plate and the hydrogen fuel cell bipolar plate plate, and
wherein the Turing-pattern air microstructure configuration comprises a plurality of large air channels extending from an air inlet of the air fuel cell bipolar plate for fluidic connection to a plurality of smaller air channels in a dendritic arrangement, and the plurality of large air channels extend toward a middle region of the air fuel cell bipolar plate, and transition into the plurality of smaller air channels along a diagonal line of the air fuel cell bipolar plate.

11. The fuel cell of claim 10, wherein the Turing-pattern coolant microstructure configuration comprises a plurality of large coolant channels extending adjacent to a coolant inlet for fluidic connection to a plurality of smaller coolant channels.

12. The fuel cell of claim 11,
wherein the air fuel cell bipolar plate comprises an anode, and
wherein the hydrogen fuel cell bipolar plate comprises a cathode.

13. A fuel cell, comprising:
a membrane electrode assembly;
an air fuel cell bipolar plate, having a dehomogenized Turing-pattern air microstructure configuration that facilitates flow of air along, through, and contacting the dehomogenized Turing-pattern air microstructure configuration; and
a hydrogen fuel cell bipolar plate having a dehomogenized Turing-pattern hydrogen channel configuration that facilitates flow of hydrogen gas along, through, and contacting the dehomogenized Turing-pattern hydrogen channel configuration,
wherein the air fuel cell bipolar plate and the hydrogen fuel cell bipolar plate are spatially arranged in a stacked formation such that the dehomogenized Turing-pattern air microstructure configuration and the dehomogenized Turing-pattern hydrogen microstructure configuration are opposed to define a dehomogenized Turing-pattern coolant microstructure configuration that includes at least one fluid channel that that facilitates flow of a coolant along, through, and directly contacting the dehomogenized Turing-pattern coolant microstructure configuration so as to directly contact the air fuel cell bipolar plate and the hydrogen fuel cell bipolar plate, and
wherein the Turing-pattern hydrogen microstructure configuration comprises a plurality of large hydrogen channels extending along side edges of the hydrogen fuel cell bipolar plate for fluidic connection to a plurality of smaller hydrogen channels in a dendritic arrangement, and the plurality of large hydrogen channels branch along the side edges of the hydrogen fuel cell bipolar plate such that the plurality of smaller hydrogen channels extend across to the plurality of large hydrogen channels that are adjacent to the side edges of the hydrogen fuel cell bipolar plate at the hydrogen outlet.

* * * * *